Figure 4:
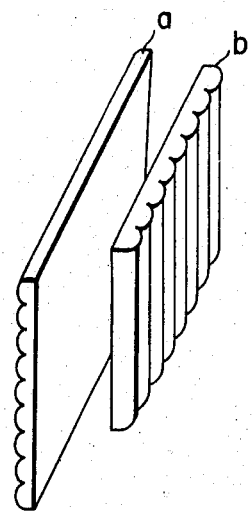

United States Patent [19]
Miyagi

[11] 3,791,712
[45] Feb. 12, 1974

[54] PROJECTION SCREEN

[75] Inventor: Kiyoshi Miyagi, Yokohama, Japan

[73] Assignee: Matsushita Electric Industrial Co., Ltd., Kadoma-shi, Osaka, Japan

[22] Filed: Apr. 18, 1972

[21] Appl. No.: 245,158

[30] Foreign Application Priority Data
Apr. 20, 1971   Japan.............................. 46-25889

[52] U.S. Cl. ................................ 350/128, 350/167
[51] Int. Cl. ......................................... G03b 21/60
[58] Field of Search........................... 350/128, 167

[56] References Cited
UNITED STATES PATENTS
2,529,701   11/1950   Maloff.............................. 350/128
2,991,693   7/1961   MacNeille........................ 350/128
2,028,496   1/1936   Chiti................................ 350/128 X FOREIGN PATENTS OR APPLICATIONS
736,754   9/1932   France.............................. 350/128
345,111   12/1936   Italy................................ 350/128

Primary Examiner—Samuel S. Matthews
Assistant Examiner—Richard A. Wintercorn
Attorney, Agent, or Firm—Stevens, Davis, Miller & Mosher

[57] ABSTRACT

A projection screen having lenticular lenses in which the directions of refraction differ by 90°. Each lens is made in such a manner that the angles of refraction are varied from the central portion of the lens to its end portions so that an incident ray is uniformly dispersed throughout the service area. The surfaces of the lenticular lenses are finished to prevent a virtual image.

4 Claims, 10 Drawing Figures

FIG. 1
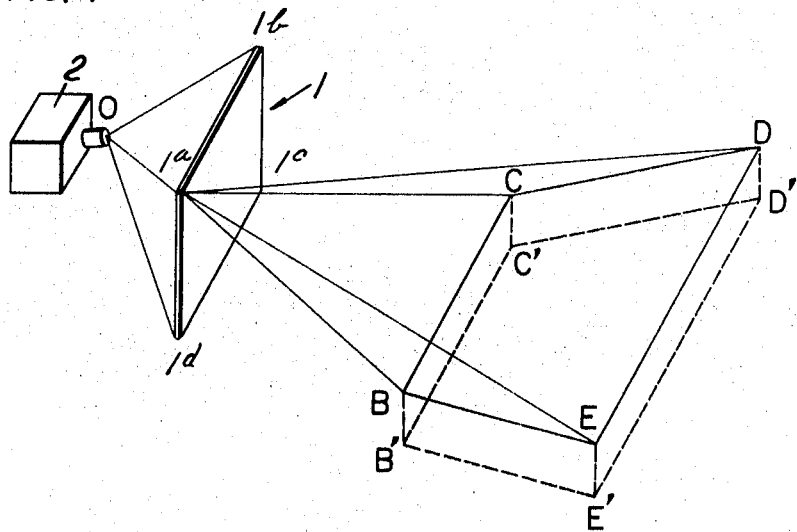
FIG. 2
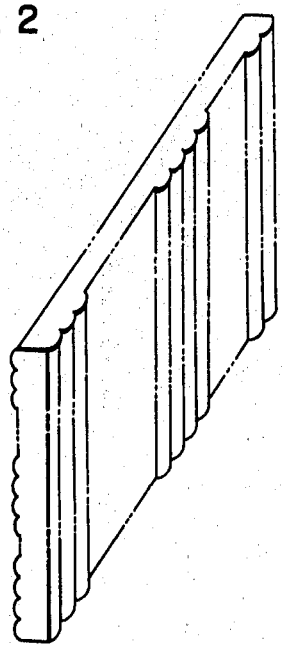
FIG. 3

PROJECTION SCREEN

This invention relates to a projection screen which can be used by many people in a room or in an outdoor area of ordinary brightness no dark room being required. More particularly, it refers to a projection screen which makes it possible to show a bright and clear image regardless of brightness in a service area larger than the area of the screen where the image is projected and which can be easily manufactured. Further, the image can be watched by many people in a service area larger than the area of the screen.

It is well known that where this type of projection screen is made of white cloth, white paper or a planar transparent plastic plate with a rough surface, the ambient light in the room is reflected by the surface thereof and accordingly the quantity of light from the projector is required to be greater than the ambient light. Therefore, the object of obtaining a bright and clear image on the screen even in a bright room has not been sufficiently achieved.

In order to accomplish this object more properly, there have been suggested some screens for projection as follows.

A. As disclosed in Japanese Patent Publication No. 4482/1951, a number of rectangular cut pieces of concave mirror or convex lens are arranged on a plane without spaces therebetween so that the projection light may be reflected within a solid angle covering the area of the audience seats.

B. As disclosed in Japanese Utility Model Publications No. 859/55, No. 860/55 and No. 861/55, a plurality of spheric transparent members may be arranged as described in paragraph A.

C. As disclosed in Japanese Utility Model Publications Nos. 10058/51, 5957/52, 2365/55 and 2373/55, a plurality of condensers and diffusers may be arranged as described in A.

D. As disclosed in Japanese Utility Model Publication No. 3254/67, a transparent synthetic resinous film having a number of fine wrinkles thereon is interposed by between two transparent plates and fixed therein. Further, the outer surface of one of the transparent plates is provided with non-reflection treatment and the inner surface of the other transparent plate is provided with a number of fine projections and recesses.

E. As disclosed in Japanese Utility Model Publication No. 27671/60, a screen having pyramid-shaped projections and recesses, and having white metallic powder therein.

F. As disclosed in Japanese Utility Model Publication No. 7765/59, a screen having a flat surface on one side thereof and an irregular surface on the other side thereof.

These prior art projection screens have defects respectively which will now be described hereinbelow.

In screens of the type described in paragraph (A), the manufacture thereof is complicated since a number of semispherical lenses must be arranged on the plane. Particularly in order to prevent the projection light from being diffused out of the audience seat area, it is necessary to prepare different dimension of lens elements for the central part and for the marginal part of the screen in advance, and accordingly, the manufacture is extremely complicated.

In screens of types (B), (C) and (D), manufacture is also complicated and expensive. In screens of types (D) and (E), the ambient light is reflected by the processed surface of the glass or white particles mixed in the glass, thereby disturbing the projected image.

In screens of type (F), it is impossible to efficiently utilize the light by concentrating the light in a certain area of the audience seats although it is possible to obtain a certain width of light diffusion if the shape of the projected portions is the same over the whole area of the screen. It becomes very difficult to manufacture the screen if the shape of the projected portions is properly varied to effectively utilize the light by concentrating the reflected light within the area of the seats.

The primary object of the present invention is to provide a projection screen usable in a bright service area which can be easily manufactured at low cost.

Another object of the present invention is to provide a projection screen usable in a bright service area which efficiently reflects the projection light within a required solid angle just covering the service area which is larger than the area of the screen.

Figure 5:
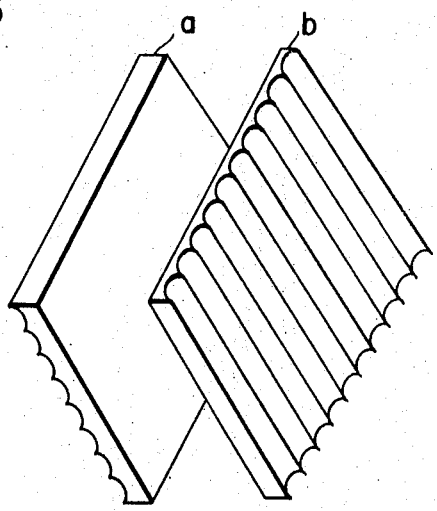
Figure 6:
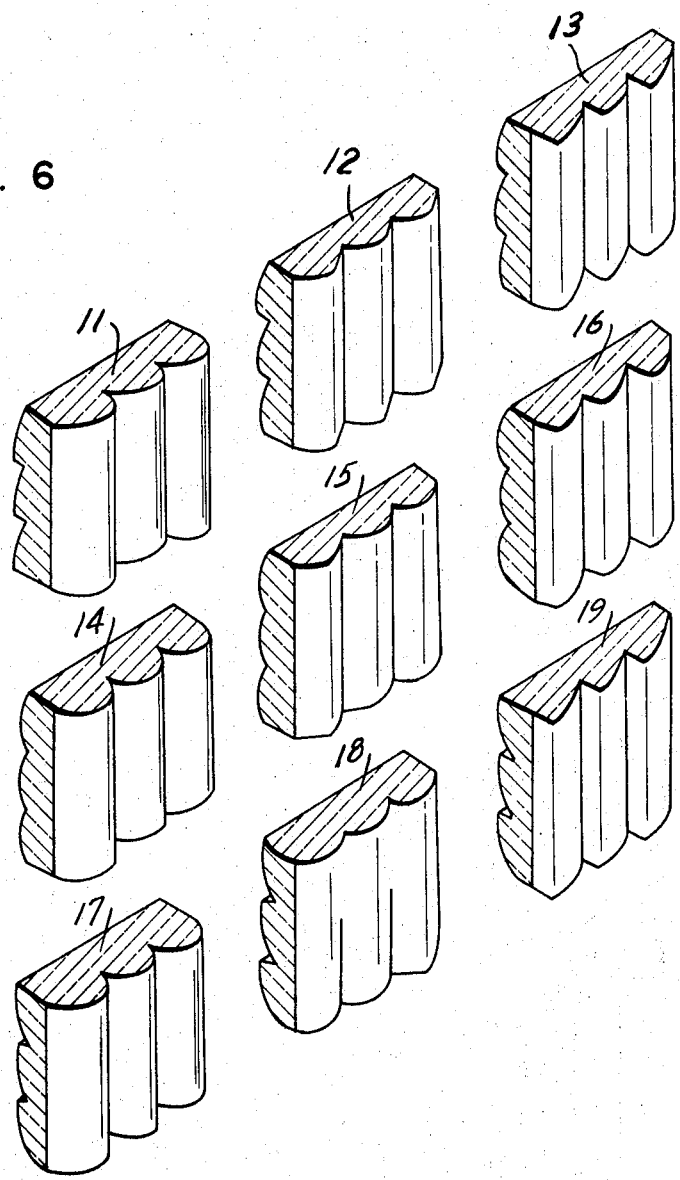
Figure 7:
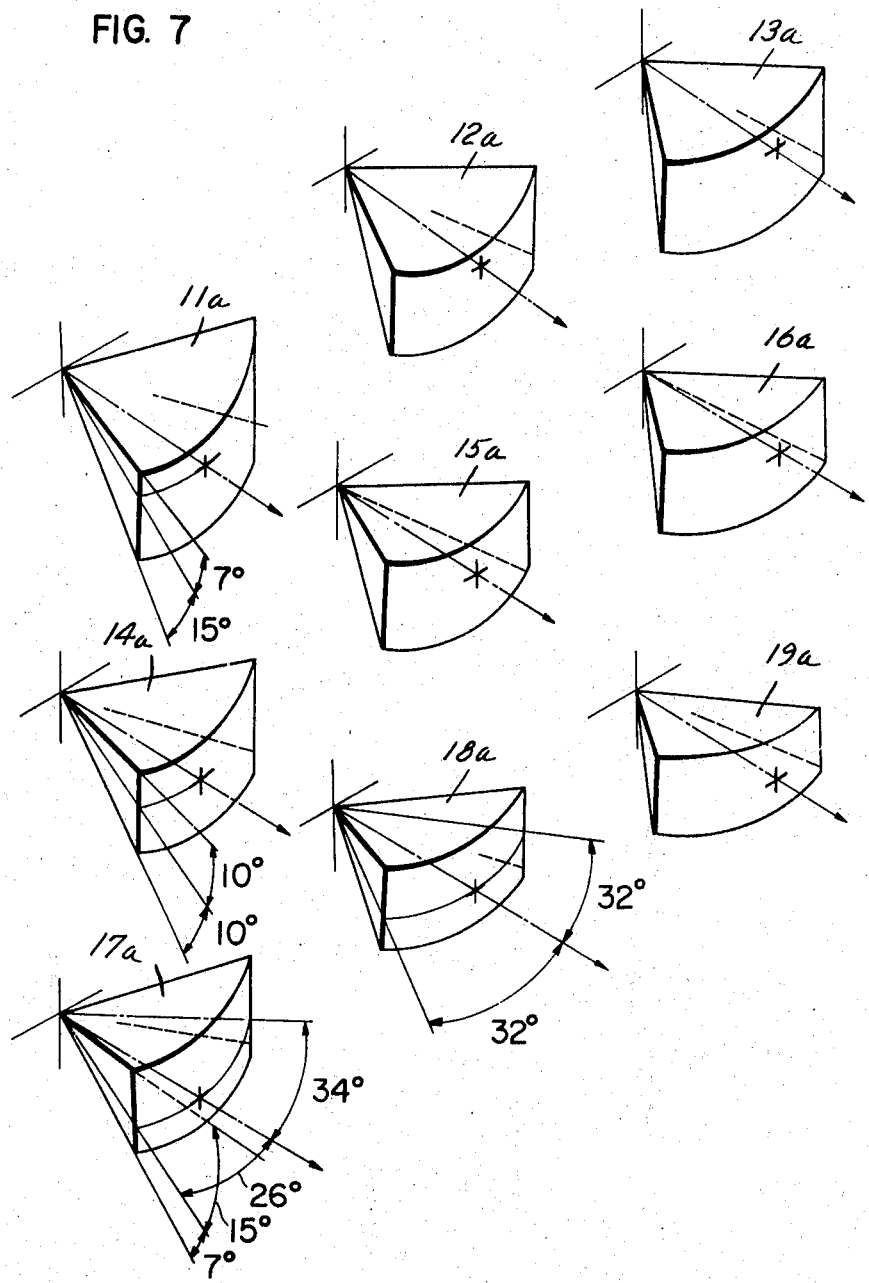
Figure 9:
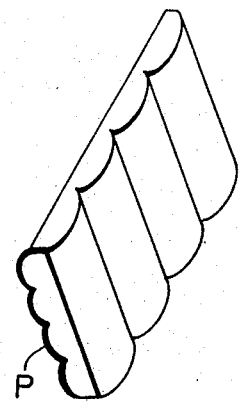
Figure 8:
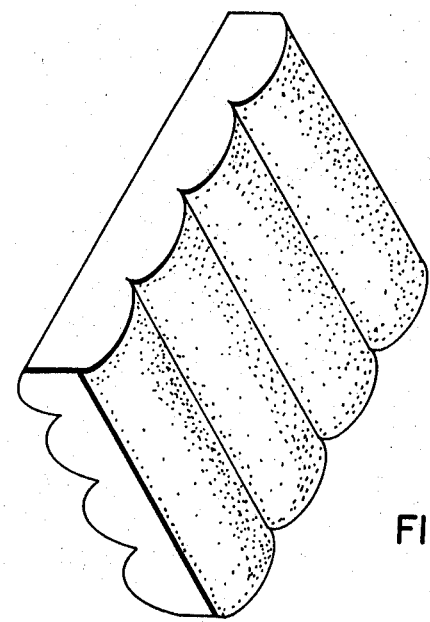
Figure 10:
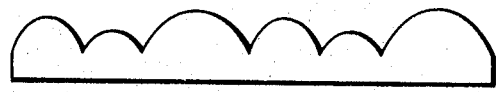

Other objects, features and advantages of the present invention will be made apparent from the following detailed description of the preferred embodiments thereof taken in conjunction with the accompanying drawing in which:

FIG. 1 is a perspective view of a projection system utilizing a projection screen in accordance with the present invention, FIGS. 2 and 3 are perspective views showing some embodiments of the projection screen in accordance with the present invention, FIGS. 4 and 5 are exploded perspective views showing embodiments of the projection screen in accordance with the present invention as shown in FIGS. 2 and 3, FIG. 6 is an exploded perspective view showing sections of a projection screen to be bound together into a projection screen in accordance with the present invention, FIG. 7 is a diagram showing directions of light refracted through the sections of the screen as shown in FIG. 6, FIGS. 8 and 9 are perspective views showing other embodiments of the screen in accordance with the present invention, and FIG. 10 is a cross sectional view of another embodiment of the screen in accordance with the present invention.

Referring now to FIG. 1, a projection system is explained assuming that an image is projected onto a projection screen 1 having four corners 1a, 1b, 1c and 1d from a projector 2, and that the image on the projection screen 1 is observed by spectators sitting at positions B, C, D and E. Under these circumstances, it is required to disperse the light from the point 1a of the projection screen 1 only within the range of the pyramid defined by a triangle 1a-B-E vertically and a triangle 1a-D-E horizontally.

Similarly, the light from the other three points 1b, 1c and 1d is only required to be dispersed within the range of pyramids having a common bottom defined by four points B, C, D and E and apexes of the pyramids 1a, 1b, 1c and 1d respectively.

When the difference in the level of the eyes of the spectators such as B, B', C, C', D, D', E, E' is taken into consideration, the pyramid becomes one with a bottom having four corners of B', C', D and E.

In order to obtain such dispersion of light as mentioned above, the projection screen in accordance with the present invention has a lenticular lens configuration on both surfaces thereof. The lenticular lens has a horizontal axis of the lenticular elements on one of the surfaces and has a vertical axis on the other surface of which the first embodiment is shown in FIG. 2 and another embodiment is shown in FIG. 3. In the embodiment shown in FIG. 2, each of the lenticular lenses has a rounded surface and the other embodiment shown in FIG. 3 illustrates lenticular lenses having sharp ridges. The width of the lenticular elements is selected to be proper for bearing an image thereon obtained from the raster of a television picture tube taking into account the size of the projection screen and the distance from the spectators.

The screen as described above can be formed as a single plate having the lenticular lenses on both sides thereof, but when it is difficult to form a screen as a single plate, the screen may be made by binding a one-side lenticular lens plate to the back of another lens plate with the axis of the lenticular elements thereof set perpendicular to that of the other as shown in FIGS. 4 and 5. The two lenticular lens plates $a$ and $b$ should be affixed to each other by use of an adhesive having the same refraction index as that of the lenticular lens plates. Alternatively, the screen can be made in one step by means of a two-side heat press.

In the projection screen to be used in an ordinary light, it is necessary to prevent excess dispersion of the light rays refracted from the screen, so that the light rays refracted from the screen can be concentrated only within the service area. To meet this requirement, the configuration of the lenticular lens plate is employed so that the lenticular element in the marginal portion of the screen may disperse more light inwardly to the central portion thereof than outwardly so as to concentrate the light to a required area of the seats.

One of the preferable manners of making the projection screen of the present invention is shown in FIGS. 6 and 7. When the screen is too large to be manufactured as a single plate, each section of the screen is separately manufactured and thereafter they can be bound together into one plate by means of suitable adhesive.

In the embodiment shown in FIG. 6, the screen is divided into nine sections, such as an upper-left section 11, an upper-central section 12, an upper-right section 13, a middle-left section 14, a middle-central section 15, a middle-right section 16, a lower-left section 17, a lower-central section 18, and a lower-right section 19. The number of these sections selected depends on factors including the size of the screen and the manner of forming the lenticular lenses.

The lenticular lenses shown in FIG. 6 are shown somewhat enlarged so that the differences in their configurations can be clearly seen. When observing the front surfaces thereof, the lenticular lenses on the left sections 11, 14, 17 those on the central sections 12, 15, 18 and those on the right sections 13, 16, 19 are respectively identical, while those on the upper sections 11, 12, 13, those on the middle sections 14, 15, 16, and those on the lower sections 17, 18, 19 are different.

The lenticular lenses on the reverse sides of these sections are similar to those on the front surfaces, but they are turned 90 degrees. In other words, the lenticular lenses on the reverse side of each section are arranged normal to the axis of the front lenticular lenses, and the lenticular lenses on the reverse sides of the upper sections 11, 12, 13, those on the reverse side of the middle sections 14, 15, 16, and those on the reverse sides of the lower sections 17, 18, 19 are identical within the upper middle and the lower sections respectively, but they are different in the left sections 11, 14, 17, the central sections, 12, 15, 18, and the right sections 13, 16, 19.

When discussing the front lenticular lenses only, those on the left sections 11, 14, 17 are formed so that the light rays refracted will be dispersed inwardly more than outwardly, and so in the case of the lenticular lenses on the right sections 13, 16, 19. But the light rays refracted through the central sections are uniformly dispersed in the horizontal or lateral directions.

When discussing the lenticular lenses on the reverse sides of the sections, those on the upper sections 11, 12, 13 and the lower sections 17, 18, 19 are formed so that the light rays refracted therethrough are dispersed inwardly more than outwardly, while the light rays refracted through the middle sections 14, 15 and 16 are uniformly dispersed in the vertical directions.

When these front lenticular lenses and those on the reverse side of each sections are combined, the light rays will be dispersed as shown in FIG. 7, in which the light rays dispersed from each of said sections are denoted by the reference numeral same as those used to show the corresponding sections with the suffix letter $a$ added.

The numerically shown angle of dispersion of the light rays in FIG. 7 are merely an example of the projection screen used in a classroom which is 8 meters × 12 meters in area. In this example, the light rays 17$a$ which are refracted through the lower-left section 17, are dispersed 34° inwardly and 26° outwardly while they are dispersed 15° upwardly but dispersed downwardly only 7°. As to the horizontal dispersion the light rays refracted through the left sections 11, 14, 17 are dispersed 34° inwardly and 26° outwardly, the central sections 12, 15, 18 are capable of dispersing the light rays 32° to each sides, and the light rays refracted through the right sections 13, 16, 19 are dispersed 34° inwardly and 26° outwardly. However, as to the vertical dispersion, the light rays are dispersed 7° upwardly and 15° downwardly from the upper sections 11, 12, 13; 10° upwardly and downwardly from the middle sections 14, 15, 16; and 15° upwardly and 7° downwardly from the lower sections 17, 18, 19. With this arrangement, the light refracted from the screen will be uniformly dispersed within the service area which is large enough to cover the spectators' seats for many persons, such as 40 to 50 when the screen is used in a classroom. However, when the screen is to be used in the outdoor, it can be formed by more than nine sections so as to be capable of showing the image to a very large number of people.

Since the projection screen in accordance with the present invention has lecticular lenses on both surfaces thereof so that the projection light may be dispersed horizontally at one surface and vertically at the other surface thereof, it becomes possible to direct the projection light only in the range of the spectator seats and enhance the efficiency of light used. Further, by making the refraction angle vary as the position of the lenticular element goes from the center to the marginal portion of the screen, the projection light is uniformly dispersed toward the spectators. In manufacturing, the configuration of the lenticular lens is not as complicated as that shown in Japanese Patent Publication No. 4482/51 since the dispersions into different directions are made by separate surfaces of the screen, the mold for the lens being easily made. Further, the loss of light at the junctures between lenticular elements is decreased owing to the simple configuration of the lenticular lens elements.

In addition, in accordance with the present invention, the surface reflection at the surface of the screen is very small owing to the transparent lenticular lens formed on both surfaces of the screen. In more detail, the surfaces of the screen will hardly reflects ambient light incident thereupon and projection light is efficiently transmitted therethrough. According to some experiments, it was proved that 1000 lux high illumination upon the front side of the screen did not disturb a color slide projection of 35 mm size slide film.

However, there is one problem in the projection screen in accordance with the present invention as described hereinabove. It is a spectral rainbow like virtual image appearing vertically and horizontally on an image on the screen which particularly includes white portions. This is due to the lenticular configuration formed on both surfaces of the screen. Such a virtual image was recognized in our experiments.

The above effect is overcome by, as shown in FIG. 8, very slightly matting the mirror finished surface of the lens to a degree such that when looking at an object through the matted lens a configuration thereof may be dimly seen, in other words to a degree between a frosted glass and a transparent glass. It will be readily understood that the rough treatment of the surface of the lenticular lens deteriorates the particularly directed refraction characteristic. In our experiment, however, it was proved that the virtual image can be eliminated by lowering the direction property only by 10 percent. Another way of eliminating the spectral virtual image is to vary the pitch of the respective lenticular elements of similar shape as shown in FIG. 10.

Although the invention has been described with reference to a transmission type screen in the preferred embodiments hereinabove, it is possible to apply this invention to a reflection type screen. One of the examples is shown in FIG. 9, in which a reflection layer P as of aluminum having high reflectance is coated on the back surface of just the same screen as that described hereinabove.

It should be noted, however, that the refraction angle is required to be different from that of the transmission type screen in case of a reflection type screen in order to obtain the same dispersion of light as that of the transmission type screen.

The one-side lenticular lens plate is prepared by molding or pressing. As the material for making the lenticular lens plate, organic glass transparent plastic is preferred. If a mold is prepared in advance to mold the lenticular lens plate, the mold may be of planar shape or drum shape. In the case of a drum shape mold, the molded lens is cut along the axial direction and stretched into a plate shape lens. Alternatively, the drum shape mold is used as a rolling roll to make a rolled plate of lenticular lens.

What is claimed is:

1. A transparent plastic projection screen for receiving incident light rays, comprising a first group of lenticular lenses formed on one side of said screen, a second group of lenticular lenses formed on the other side of said screen, said first group of lenticular lenses being normal over the entire area of the screen to said second group of lenticular lenses, the configuration of said first and second group of lenticular lenses varying in accordance with the position of said lenses so as to uniformly disperse the incident light rays over a viewing area which is larger than the area of said screen, the surfaces of at least one of said first and second groups of lenticular lenses being finished for preventing the formation of a virtual image.

2. A projection screen according to claim 1, in which said screen is divided into a plurality of sections, the configuration of the lenticular lenses in each of said sections varying in accordance with the position of said section of said screen.

3. A projection screen according to claim 1, in which the surface of at least one of said first and second groups of lenticular lenses is provided with a reflection layer.

4. A projection screen according to claim 1, in which said groups of lenticular lenses have similar configurations but different pitches.

* * * * *